Feb. 20, 1934.  R. ROSSMANN  1,948,051
WEAVING
Filed Sept. 16, 1930   3 Sheets-Sheet 1
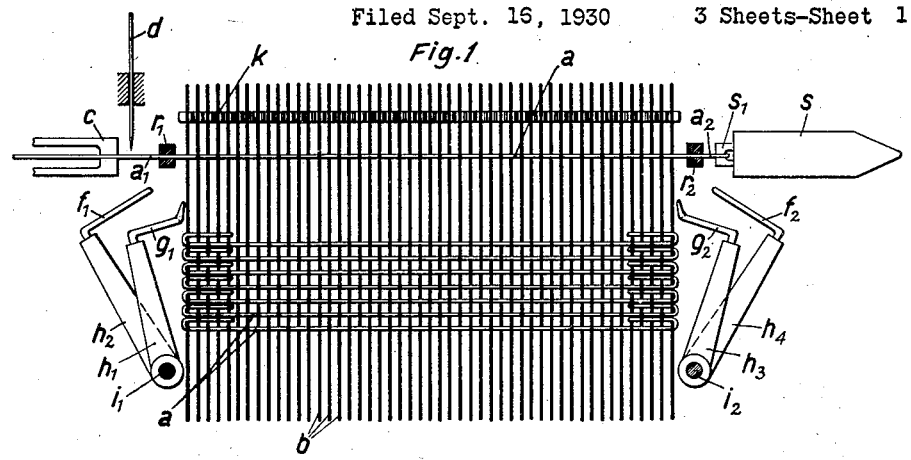
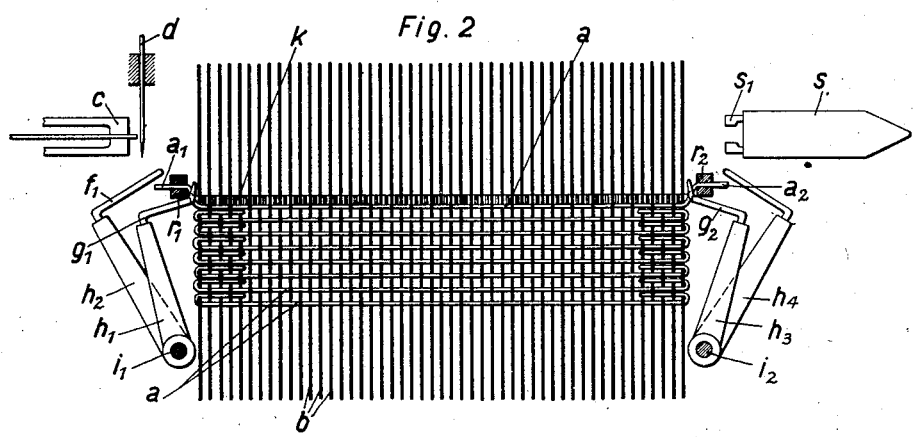
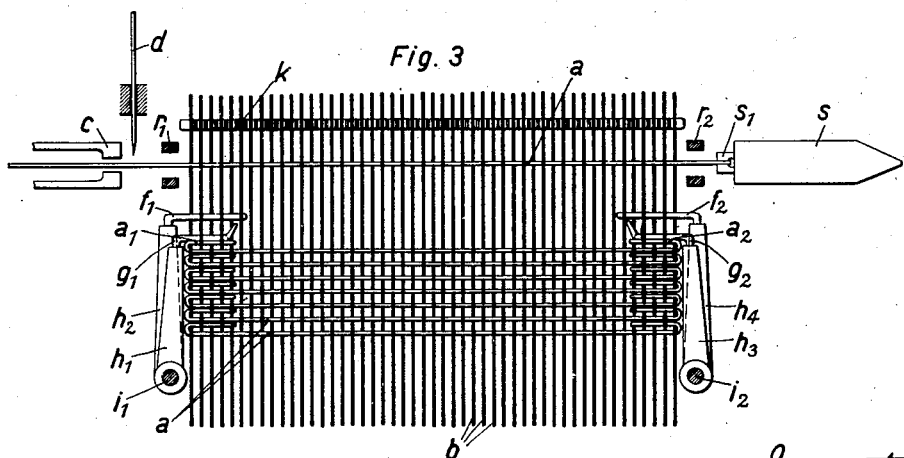

Feb. 20, 1934.  R. ROSSMANN  1,948,051
WEAVING
Filed Sept. 16, 1930  3 Sheets-Sheet 2
Fig. 4 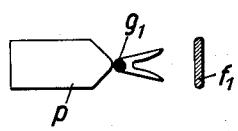 
Fig. 5 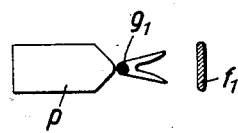 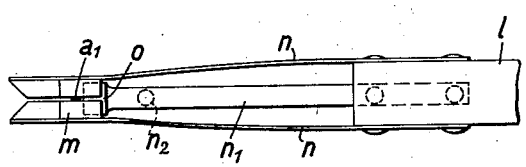

Fig. 7 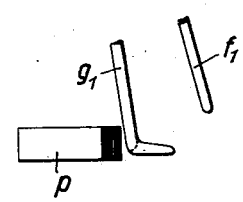 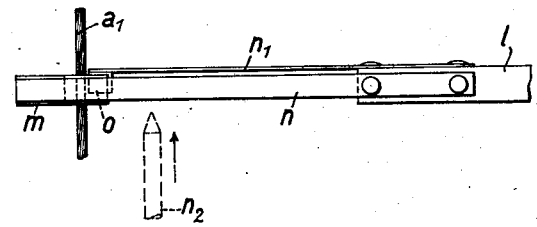
Fig. 8 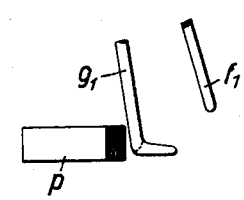 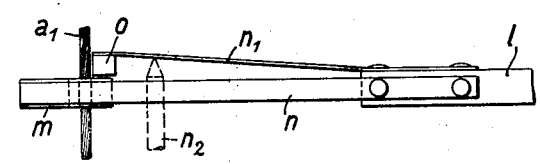

Inventor,
Rudolf Rossmann,
By Henry Orth Jr.
atty.

Feb. 20, 1934.  R. ROSSMANN  1,948,051

WEAVING

Filed Sept. 16, 1930  3 Sheets-Sheet 3

Inventor,
Rudolf Rossmann,
By [signature]
Atty.

UNITED STATES PATENT OFFICE 1,948,051

WEAVING

Rudolf Rossmann, Munich, Germany, assignor to TEFAG Textil Finanz A. G., Zurich, Switzerland Application September 16, 1930, Serial No. 482,323, and in Germany September 23, 1929

15 Claims. (Cl. 139—126)

This invention has reference to certain improvements in weaving and among other advantages and objects it refers to means of obtaining a better and more uniform formation of the selvedge and to means of facilitating the manipulation and simplifying the construction and arrangement of the parts associated with the selvedge forming means. In weaving machines or looms with thread grippers or so-called nipper shuttles and using stationary spools or bobbins for the weft or filling thread it has generally not been possible heretofore to insert the weft or filler with the desired tension and to beat it up in a satisfactory manner. This difficulty is due to the fact that the filling threads or wefts after the insertion into the shed, even though they have been introduced under tension are released at both ends or at one end only, as for instance by being cut off or by becoming disconnected from the weaving shuttle, before they can be beaten up by the reed. This short time is sufficient for the wefts, as the instrumentalities in engagement therewith are relieved to contract somewhat and to become warped and deformed, fact which causes a great many inconveniences and annoyance in the weaving operation. There is the additional inconvenience that the ends of the thread are usually projecting freely beyond the edge of the fabric and fail to form the desired comparatively stiff selvedge. With the new method of weaving about to be described these difficulties are avoided and it becomes possible to obtain a stiff, dense and uniform selvedge. In view thereof the invention in its broad features provides for the gripping or nipping shuttle to remain under tension after its insertion, until it has been beaten up. Thereupon the still tightly retained ends of the thread are bent into the fresh shed during the insertion of the next filling thread and are forced somewhat against the threads or sides of the shed, whereupon they are tightly beaten up together with the new weft.

This broad feature of the invention is carried out by means of a machine in such a manner that the weft or filling thread is of a length somewhat exceeding the width of the fabric, provision being made moreover to cause the weft after its insertion to be retained for a time by its connection with the thread feeder, that is to say, at the feeding side of the weft or filling thread, which may be referred to in the following specification as feeding or gripping clamp. Thereupon special thread clamping means or grippers, so-called selvedge clamps, are closed at both sides of the fabric near the edges thereof. The filling thread is then cut off at the feeding side between the feeding clamp and the selvedge clamping means, while at the other side of the fabric it is released therefrom by the opening of the shuttle clamp. Thereupon the weft is beaten up by the reed, while the edge clamping means which hold the ends of the filler are likewise moved forward and transfer these ends to special means, which may be called selvedge formers and which during the insertion of the succeeding weft bend these end pieces into the fresh shed and force them against the sides or threads thereof. At the succeeding beating up of the weft the two turned-over thread ends are tightly beaten up by the next weft which engages therewith. Thus it becomes possible even in the case of looms or weaving machines with gripping or nipping shuttles to place the weft or filler thread under a certain tension into the shuttle and to beat it up and to retain it in its proper position permanently by a tight selvedge.

The invention will be more fully described with reference to the accompanying drawings in which by way of exemplification the operation of the machine is shown diagrammatically in different stages of operation. For the sake of clearness only a small part of the warps and of the fabric has been indicated, while all other parts which do not cooperate with the means for the carrying out of the new weaving method have not been shown in the drawings. Furthermore the different important members are shown of such size that their operation may clearly be distinguished irrespective of the fact that such parts, as shown, will appear partly too large and partly too small.

For a more complete understanding of the invention, reference may be had to the accompanying drawings in which Fig. 1 is a fragmentary plan view showing the weft thread immediately after insertion into the shed and the clamping means still in operative position;

Fig. 2 is a similar view showing the clamping means in a released position and the weft thread severed;

Fig. 3 shows a similar view showing the ends of the weft thread inserted into the shed by the forked selvage formers;

Fig. 4 is a side elevation of a selvage clamp with the clamping jaws in an open position;

Fig. 5 shows a similar view of the selvage clamp with the clamping jaws in a closed operative position;

Fig. 7 is a plan view of Fig. 4;

Fig. 8 is a plan view of Fig. 5;

Figure 6:
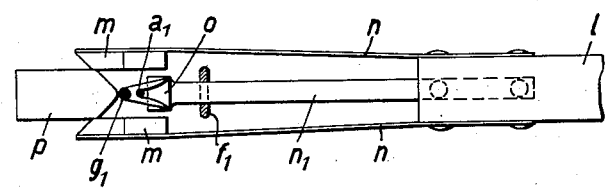
Fig. 6 shows a side elevation of a selvage clamp transmitting a weft thread to a selvage fork and being locked in an open position.

As appears from Figures 1 to 3 the wefts or filling threads are indicated at $a$, while $b$ shows the warp threads. The filling threads are pulled off from stationary filling spools or bobbins not shown in the drawings and usually arranged at the left of the fabric or tissue, usually the feeding side, where they are transferred from a feeding clamp or gripper $c$ to the nipping or gripping weaving shuttle $s$ or to its clamp $s_1$ which by its movement from left to right pulls the filling thread through the open shed of the warp. The weft or filling thread $a$ the end portions $a_1$, $a_2$ of which project laterally beyond the warp threads $b$, is beaten up and placed adjacent the preceding filling threads $a$ by the action of a reed $k$ of usual construction and pushing it close to these threads. On both sides of the supply of warp threads two selvedge clamps or grippers $r_1$, $r_2$ shown diagrammatically in Figs. 1–3, are provided. The details of selvedge clamps are shown more clearly in Figures 4 to 9 of the drawings. Each of these two selvedge clamps comprises a reciprocable bar $l$ which may be moved in parallelism to the warp threads and carrying two clamping jaws $m$ which are secured thereto by means of the spring-acting arms $n$ and serve for the purpose of reliably taking hold of the projecting ends of the filling threads $a_1$, $a_2$. At right angle with relation to the jaws $m$ another jaw $o$ is provided which is supported on a spring-acting arm $n_1$ and is ordinarily disposed between the two other jaws $m$, keeping them in the open position. Thus, if the jaw $o$ which acts as a locking member is laterally forced outwards, as for instance by means of a small pusher or finger $n_2$ (Figures 7 and 8), the jaws $m$ will become snappingly engaged and will grip between them the end of the filling thread placed between the jaws. Between the feeding clamp $c$ and the left-hand clamp or gripper $r_1$ a knife-like cutter $d$ is provided. In front of the grippers $r_1$, $r_2$ the means are arranged for the bending of the ends of the filling threads which comprise rocking levers $h_1$, $h_2$, and respectively $h_3$, $h_4$ which are mounted on studs $i_1$ and $i_2$ laterally arranged with relation to the warp threads. The free ends of the rocking levers $h_1$, $h_3$ are provided with fork-shaped fingers or the like $g_1$, $g_2$ into which the ends of the weft threads are inserted in the beating up operation of the reed $k$. The free ends of the rocking levers $h_2$, $h_4$ are so shaped as to constitute broad bars $f_1$, $f_2$ which, while the rocking levers $h_2$, $h_4$ are rocking inwards, force the warp threads of the selvedge that is to say the threads at the edge of the warps supply, away from each other, so as to increase the shed at these points. The rocking levers $h_2$, $h_4$ are therefore acting as shed increasing means which during their inward rocking movement are accelerated or given a leading movement by means not shown with relation to the other rocking levers $h_1$, $h_3$ so that these rocking levers $h_1$, $h_3$ which act as selvedge formers may readily enter with their forked fingers $g_1$, $g_2$ into the shed which has been enlarged at the edges of the fabric.

In Fig. 1 the relative position of the different members is illustrated shortly after the insertion of the filling thread or weft while the shed is still open. The weft $a$ has been passed through the warps and is kept taut between the closed feeding clamp $c$ at the left and the shuttle clamp $s_1$ of the nipping shuttle $s$ at the right. The additional selvedge clamps or grippers $r_1$ and $r_2$ have become closed, gripping the ends $a_1$, $a_2$ of the weft $a$. Shortly thereafter the shuttle clamp $s_1$ (Fig. 2) is opened and by the advancing movement of the cutting knife $d$ which is here shown diagrammatically as an ordinary knife, the weft is severed between the feeding clamp $c$ and the selvedge clamp $r_1$. Thereupon the reed $k$ is moving forward and beats the cut off weft $a$ which has been inserted in the shed against the preceding wefts as shown in Fig. 2. In this beating up movement of the reed $k$ the edge clamps $r_1$ and $r_2$ are likewise moved forward and transfer the ends $a_1$ and $a_2$ of the threads onto the forked selvedge formers $g_1$ and $g_2$. Thereupon the new shed is opened after the receding of the reed in a known manner, and immediately thereafter a new filling thread may be introduced. For the sake of clearness of understanding of the drawings it has been assumed that this filling thread or weft is inserted in the same direction as the preceding one, though of course, this is by no means a condition for the carrying out of the invention.

In Fig. 3 the new, still open shed is shown with the next succeeding filling thread $a$ inserted. During the insertion of the thread the feeding clamp $c$ is of course open, as indicated in Fig. 3. The forked selvedge formers $g_1$ and $g_2$ have entered the shed by the rocking inward of their levers $h_1$ and $h_3$ and have bent the ends $a_1$ and $a_2$ of the threads inward. The bar-shaped, shed enlarging arms $f_1$ and $f_2$ which are moving in advance of the selvedge formers have likewise been moved into the shed and have spread apart somewhat the selvedge warp threads, so as to increase the shed and to provide the necessary space for the preceding selvedge formers $g_1$, $g_2$.

The freshly inserted weft $a$ is then gripped again by the edge clamps or grippers $r_1$, $r_2$ and by the feeding clamp $c$ as shown in Fig. 1, while at the same time the selvedge formers $g_1$ and $g_2$ and the shed enlargers $f_1$, $f_2$ are rocked outward so as to be returned to their initial position. This stage is followed by the opening of the shuttle clamp $s_1$ the severing of the weft thread by means of the blade-like cutter $d$ and the beating up of the thread by the reed $k$ as indicated in Fig. 2. By the beating up of the threads the ends $a_1$ and $a_2$ of the thread which have been previously bent and forced into the shed by the selvedge formers $g_1$ and $g_2$ are again tightly engaged and beaten up, so that a reinforced selvedge is produced which as such has been known heretofore and has been suggested for instance for interior selvedges which are obtained in the manufacture of a plurality of fabrics on the same loom. The invention is therefore directed to the new way of producing such selvedges and to their use at the outer edges of fabric in weaving machines which operate with gripping or nipper shuttles and with stationary weft supply spools or bobbins. The transferring of the ends of the filling threads by the edge clamp or grippers is therefore effected while the thread is still held fast by the feeding clamp and the shuttle clamp. The edge clamps are controlled and regulated, so that they will be open when the filling thread is inserted, and will afford free passage for the shuttle and the filling thread. Thereupon the said edge clamps or grippers are closed and are kept closed, until they have transferred the ends $a_1$, $a_2$ of the thread to the selvedge formers. Shortly thereafter the edge clamps or grippers are opened again and become adapted for taking hold of the next succeeding filling thread.

Figure 9:
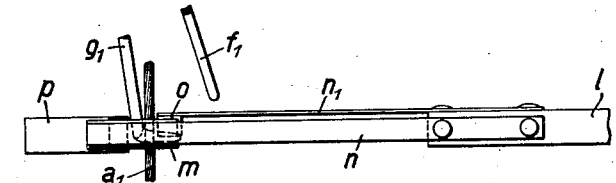
Fig. 9 is a plan view of Fig. 6.

In Figures 4, 5 and 6 an exemplification of an edge clamp or gripper is shown in side view in different operating positions, while in Figures 7, 8 and 9 the same edge clamp is shown in different plan views.

In Figures 4 and 7 the edge clamp is shown in its backward position and the clamping jaws $m$ are opened in conformity with the position of Fig. 3, so that the terminal portion $a_1$ of the inserted weft is freely supported between them, the additional intermediate locking jaw $o$ being still in the operative position. Thereupon the intermediate locking jaw $o$ is forced outward for instance by means of the pushing finger $n_2$ operating the spring-acting arm $n_1$, while the gripper or edge clamp has not yet changed its position. The jaws $m$ will then be closed as appears from Figures 5 and 8, thereby gripping the ends $a_1$ of the weft thread. The same applies of course to the other edge clamp $r_2$.

Thereupon the bars $l$ which carry the clamping jaws $m$ and which are connected to the edge clamp are moved forward together with the reed $k$ for the beating up of the weft and cause the ends of the thread to be pushed into the forked ends on the sleyedge formers. Upon continuing the forward movement the jaws $m$ of each edge clamp impinge against a wedge-shaped stop $p$, so that the jaws are spread and the respective end $a_1$ or $a_2$ of the thread is released and the corresponding locking jaw $o$ is thereby spring-actingly returned to its operative position (Figures 6 and 9). Both edge clamps or grippers $r_1$, $r_2$ are then moved back to their initial position, while they are still spread apart.

Figure 10:
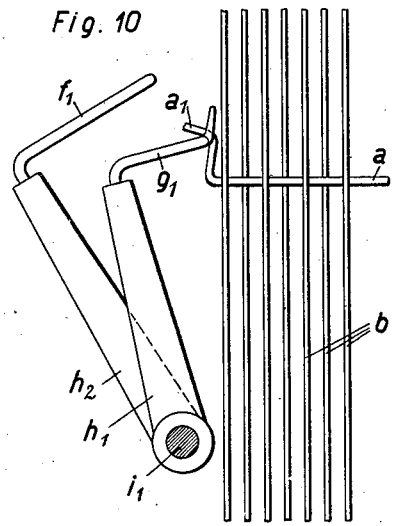
Fig. 10 is a fragmentary plan view of a spreading lever and selvage fork at the beginning of the operation of inserting the end of a weft thread.
Figure 11:
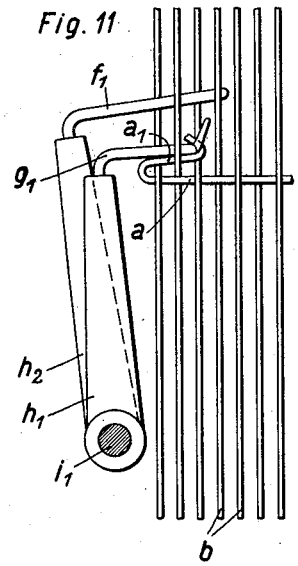
Fig. 11 is a similar view showing a spreading lever and selvage fork in an operative position with the weft thread partly inserted.
Figure 12:
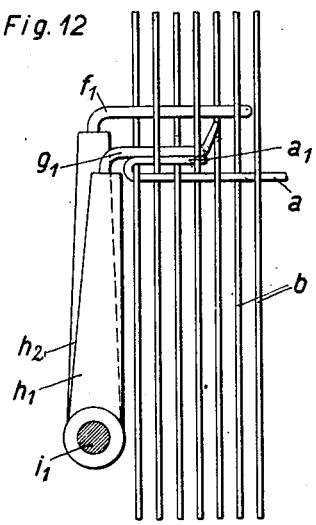
Fig. 12 is another fragmentary plan view showing the spreading lever and selvage fork at the finish of the operation of inserting the ends of a weft thread.
Figure 13:
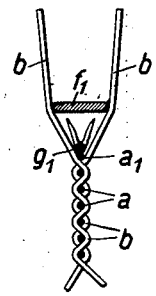
Fig. 13 is a fragmentary side elevational view showing the spreading lever and selvage fork in operative position.

It appears from Figures 10, 11 and 12 in what manner during the rocking inward of the selvedge former the end $a_1$ of the filler which has been inserted into the fork of the finger $g_1$ is bent into the new shed, and it also appears from these figures in what manner at the end of the inward movement of the selvedge former the end of the thread is caused to slide out of the fork and is placed against the corresponding filling thread by the action of the finger of the selvedge former. From the same Figures 10, 11 and 12 in combination with Fig. 13 the acceleration of the shed enlarger $f_1$ with relation to the selvedge former during the inwardly rocking movement will also become apparent and it will also be seen that the warp threads $b$ are moved apart by the operation of the bar-shaped shed enlargers.

In order to provide means of causing the two selvedge formers to enter into the open shed as far as ever possible each of the two rotating axes $i_1$, $i_2$ is placed as closely as possible near the edge of the fabric. The finger-like selvedge formers $g_1$, $g_2$ are arranged substantially at right angle with relation to their rocking levers $h_1$, $h_3$. The outer fork-shaped ends of the selvedge formers are bent outward in such a manner that they will be positioned nearly in parallelism with the warp, when the selvedge formers are rocked outward. By their rocking movement which is effected substantially at the level of the warp and of the wefts likewise the selvedge formers are sure to take hold of the ends of the wefts or filling threads (Fig. 13) and place them around the latter with their outer faces in parallelism therewith, while the ends of the filling threads are readily slipping out from the forked ends of the selvedge formers.

Figure 14:
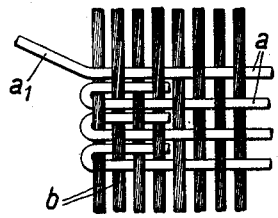
Fig. 14 is a fragmentary plan of a piece of the fabric with the improved selvage.

In Fig. 14 there is shown on an enlarged scale a section of the selvedge of the fabric with the ends of the threads bent upon themselves and inserted.

The insertion of the ends of the thread may be effected by means of different constructions and in a different manner within the broad purview of this invention, only one of the several possible forms of embodiment being shown herein for the sake of exemplification, and it should also be pointed out that the transferring of the ends of the weft thread on the feeding side of the device may be effected in a different manner, without thereby deviating from the principles of this invention. It may also be noted that it is not absolutely necessary that each one of the warp threads to be introduced and to be beaten up is provided with end portions bent upon themselves, it being admissible, whenever desired, to alternate filling threads with bent end portions with one or more filling threads without such terminal portions and which are accordingly cut off directly at the edge of the fabric, it being moreover understood that other modifications and changes may occur, so as to better adapt the invention to varying requirements and conditions of application and the convenience of the operator within the scope of the invention as defined by the appended claims.

I claim:—

1. The improvement in the weaving art, which comprises moving a plurality of warp threads to form a shed, inserting a weft into said shed, holding said weft clamped in position on both sides of the shed at a distance therefrom, further clamping the weft adjacent opposite sides of the shed, severing said weft on the side of the shed at which the weft was inserted intermediate the two clamping points on said side, releasing the severed weft, and pushing it into position at the fell of the cloth.

2. The improvement in the weaving art, which comprises moving a plurality of parallel warps, so as to form a shed, inserting a weft through said shed, clamping said weft beyond the sides of said shed at two points, spaced from each other and from said shed, releasing the clamping operation on one side of the shed at the point most remote therefrom, severing the weft intermediate the clamping points at the other side of the shed, moving the weft parallel to the warps, releasing the clamping operations, and pushing the weft into position at the fell of the cloth.

3. The improvement in the weaving art, which comprises moving a plurality of parallel warp threads, so as to form a shed, inserting a weft through said shed, holding said weft clamped in position on both sides of the shed and at a distance therefrom, further clamping the weft adjacent opposite sides of the shed, severing said weft on one side of the shed between the clamping points on said side and releasing it at the other side thereof, pushing the weft into position at the fell of the cloth, and bending the projecting severed ends of the weft into the shed.

4. The improvement in the weaving art, which comprises moving a plurality of parallel warp threads, so as to form a shed, inserting a weft through and into said shed, holding said weft clamped in position on both sides of the shed at a distance therefrom, further clamping the weft adjacent opposite sides of the shed, releasing the weft at one side of the shed and cutting it at the other side between said clamping points, pushing the severed weft into position at the fell of the cloth, making a new shed, bending the projecting severed ends upon themselves and into the new shed and inserting a weft into said new shed and clamping said weft.

5. The improvement in the weaving art, which comprises moving a plurality of parallel warp threads, so as to form a shed, inserting a weft into said shed, clamping and retaining said weft on both sides of the shed at two different points spaced from each other and from said shed, releasing the outermost clamping point at one side of the shed, and severing the weft on the other side and intermediate the respective clamping points, pushing the weft into position at the fell of the cloth, entirely releasing the weft, forming a new shed, spreading said shed and bending the projecting ends of the weft upon themselves and into the new shed, inserting a new weft into said shed and clamping said weft.

6. In a loom, a weaving shed, comprising a plurality of parallel warp threads, a feeder clamp, spacedly disposed at one side of the shed, a supply of filler thread, engageable with said feeder clamp, a nipper shuttle engageable with the weft thread and adapted to move through said shed, selvage clamping means on each side of said shed to hold the weft in position, severing means intermediate the feeder clamp and the shed, reed means engaging the shed and the inserted weft, and weft retaining means on the shuttle.

7. In a loom, a weaving shed, comprising a plurality of parallel warp threads, a weft supply, a nipper-shuttle, gripping means on said shuttle, and feeder gripping means, engageable and disengageable with the weft supply, a rockable reed parallel with the shed, and rockable weft-bending means and a warp-spreading means of a width greater than the weft bending beans on both sides of the shed, and severing means for the weft supply, intermediate the shed and the feeder gripper.

8. In a loom, a weaving shed, comprising a plurality of parallel warp threads, a weft supply, a nipper-shuttle, gripping means on said shuttle, and feeder gripping means, both engageable and disengageable with the weft supply, a rockable reed, parallel with the shed, weft cutting means intermediate the shed and the feeder gripping means, rockable weft guiding and bending means on both sides of the shed, and rockable warp-spreading means of a width greater than the weft-bending means on both sides of the shed, movable into the shed before the weft guiding and bending means, and opening means for the gripping means.

9. In a loom, a weaving shed, a nipper-shuttle, gripping means on said shuttle, a weft supply on one side of the shed, engageable with the shuttle gripping means, feeder gripping means, engaging the weft supply, and spaced from the corresponding side of the shed, additional clamping and retaining means on both sides of the shed, cutting means for the weft intermediate the feeder gripping means and the retaining means, rockable weft bending means on both sides of the shed, and rockable warp-spreading means on both sides of the shed, and operating means for the clamping and retaining means.

10. In a loom, a weaving shed, a nipper shuttle, a weft supply, feeding means for the weft supply, and gripping and clamping means therefor, cutting means near the feeding means, and a reed cooperating with the shed, rockable, substantially endwise flattened warp spreading means of a width greater than the weft-bending means on both sides of the shed, and rockable, endwise forked, weft guiding and bending means on both sides of the shed, adjacent the spreading means.

11. In a loom, a weaving shed, a nipper shuttle, a reed cooperating with the shed, weft-feeding means at one side of the shed and spaced therefrom, bi-sectional clamping and retaining means for the weft on both sides of the shed, a spring acting spreader engageable with and between the parts of the clamping and retaining means, and stopping means engageable with the spreader.

12. In a loom, a weaving shed, a reed cooperating with the shed, a nipper shuttle movable lengthwise thereof, weft feeding means on one side of the shed, bisectional weft-clamping and retaining means movable at right angle to the reed, a spring-acting spreader, engageable between the parts of the retaining means, a stop in alignment with said spreader.

13. In a loom, a weaving shed, a reed cooperating with the shed, a nipper shuttle movable lengthwise thereof, weft feeding means on one side of the shed, weft clamping and retaining means sideways of the shed, rocking levers, coaxially mounted on both sides of the shed and rockable towards and into the same, flat, warp-spreading means at the ends of some of said levers and at right angle to the same, and angularly disposed, weft-receiving and bending forked angular parts at the ends of the other levers and substantially parallel with the sides of the shed.

14. In a device as defined by claim 6 in which each selvage clamping means comprises a reciprocal support, to which are connected two spring-controlled clamping jaws and a spring-controlled locking jaw interposed between said clamping jaws.

15. In a device as defined by claim 6 in which the selvage clamping means cooperate with rocking levers, having forked selvage formers on their free ends, to bend the free ends of the weft thread into the shed.

RUDOLF ROSSMANN.